UNITED STATES PATENT OFFICE.

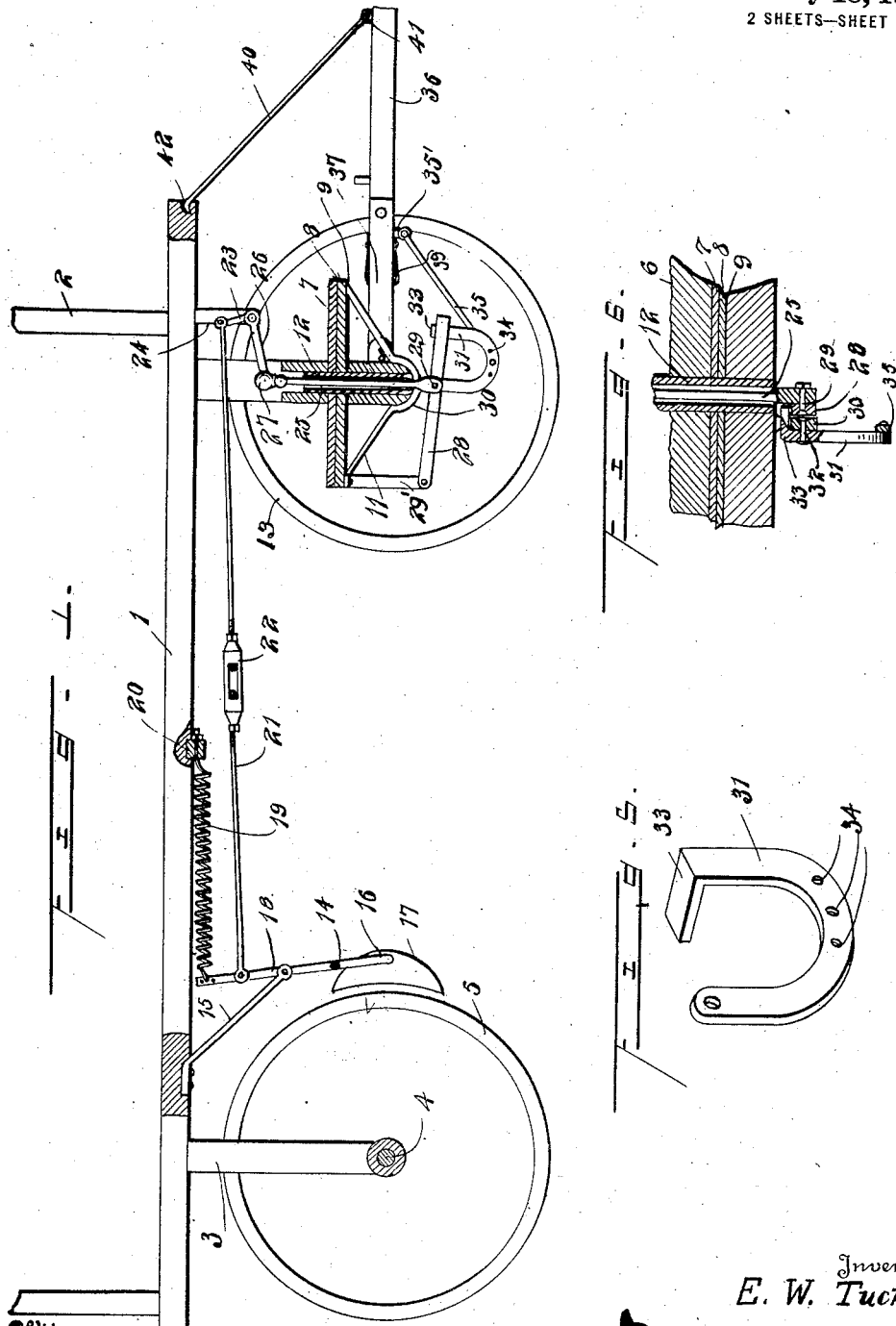

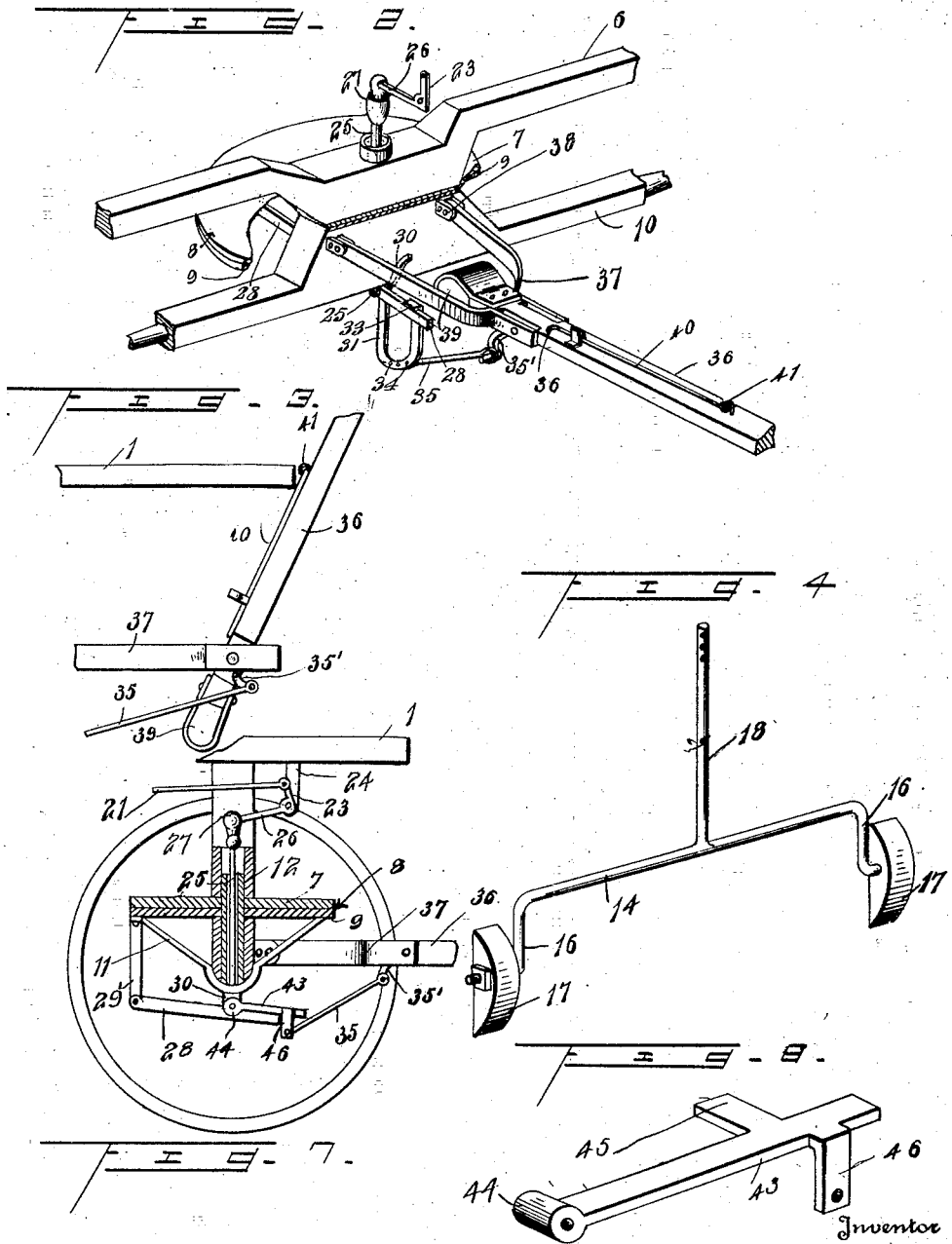

EDWIN W. TUCKER, OF NORTH PRAIRIE, WISCONSIN.

WAGON-BRAKE.

1,340,743.    Specification of Letters Patent.    Patented May 18, 1920.

Application filed March 31, 1917, Serial No. 158,856. Renewed March 18, 1920. Serial No. 366,961.

*To all whom it may concern:*

Be it known that I, EDWIN W. TUCKER, a citizen of the United States, residing at North Prairie, in the county of Waukesha and State of Wisconsin, have invented certain new and useful Improvements in Wagon-Brakes; and I do hereby declare the following to be a full, clear, and exact description of the invention, such as will enable others skilled in the art to which it appertains to make and use the same.

This invention relates to a wagon brake and more particularly to a brake especially adapted for use upon baggage trucks or the like and has for one of its objects, the provision of means whereby the brake will be automatically applied when the tongue of the truck is in a substantially vertical position or in engagement with the body of the truck, this being the normal position of the tongue when the truck is in non-use; it will therefore be seen that when the truck is in non-use, it will be prevented from moving accidentally unattended.

Another object of this invention is the provision for means connected to the brake and to the tongue for releasing the brake from engagement with the wheels of the truck when the tongue is in a substantially horizontal position or in a position occupied when the truck is being used; thus it will be seen that the brake will be automatically released when the tongue is moved into an operative position.

A further object of this invention is the provision of means for normally supporting the tongue in an inoperative position or a substantially vertical position, so that the danger of persons falling or tripping over the tongue when in non-use is entirely obviated.

A still further object of this invention is the provision of a brake of the above stated character, which shall be simple, durable and efficient, and which may be manufactured and sold at a comparatively low cost.

With these and other objects in view as will become more apparent as the description proceeds, the invention consists of the novel features of construction, combination and arrangement of parts as will be hereinafter more fully described and claimed.

For a complete understanding of my invention, reference is to be had to the following description and accompanying drawings, in which:

Figure 1 is a longitudinal sectional view of a wagon brake constructed in accordance with my invention, Fig. 2 is a fragmentary perspective view of the front bolsters of a wagon or truck illustrating the tongue applied thereto, Fig. 3 is a fragmentary side elevation illustrating the tongue in a substantially vertical position or in an inoperative position, Fig. 4 is a perspective view of the brake beam and the brake shoe applied thereto, Fig. 5 is a perspective view of a lever carried by the front bolster of the truck or wagon, Fig. 6 is a fragmentary vertical sectional view through the front bolsters taken at right angles to Fig. 1, Fig. 7 is a fragmentary vertical sectional view illustrating a modified form of the lever, Fig. 8 is a perspective view of the modified form of lever detached from the truck or wagon.

Referring in detail to the drawings, the numeral 1 indicates the body of a truck or wagon having the usual vertical standards 2. Secured to the rear end of the body 1 and to the under face thereof is a bolster 3, to which a rear axle 4 is secured. The usual rear wheels 5 are journaled to the axle 4. Secured to the front end of the body 1 and to the under face thereof is the upper section 6 of a front bolster, which has secured thereto, the upper section 7 of a fifth wheel 8. The lower section 9 of the fifth wheel 8 is mounted upon the lower section 10 of the front bolster and is secured thereto by suitable braces 11. The upper and lower sections of the front bolsters are apertured to receive a hollow king bolt 12, thus permitting the lower section 10 to move with relation to the upper section 6. The section 10 has the usual front axle secured thereto on which the front wheels 13 are journaled.

A transverse brake beam 14 is journaled to a suitable bracket 15, which is secured to the under face of the body 1, adjacent the rear wheels and the transverse brake beam 14 has downwardly depending arms 16 formed on each end to which brake shoes 17 are secured and which are adapted to engage the rear wheels 5. A vertical arm 18 is formed centrally of the brake beam 14 and has secured to its uppermost end a coiled spring 19. The other end of the coiled spring 19 is secured to a suitable bracket 20, which is secured to the under face of the body 1 at a point forward of the bracket 15, whereby the spring 19 will exert a pull upon the vertical arm 18, which will move the shoes 17 into engagement with the rear wheels 5, thus retarding the rotation of the wheels 5 or preventing them from rotating.

A rod 21 is pivoted to the upper end of the vertical arm 18 and comprises a pair of sections which are adjustably connected together by a turn buckle 22. The free end of the rod 21 is pivoted to the vertical arm portion of a bell crank lever 23, which is pivoted to a bracket 24 carried by the forward end of the body 1. The bracket 24 is disposed forwardly of the front bolster, so that the free end of the horizontal portion of the bell crank lever will be disposed in a vertical plane with the front bolster. A pin 25 extends through the king bolt 12 and has its upper end swivelly connected to the free end of the horizontal arm portion 26 of the bell crank lever 23 as illustrated at 27. A substantially horizontal bar 28 is pivoted to the lower end of the pin 25 as illustrated at 29 and has one end disposed rearwardly of the front bolster and pivoted to a bracket 29' carried by the lower section 9 of the fifth wheel 8. The other end of the bar 28 is disposed forwardly of the lower section 10 of the bolster as illustrated in Fig. 1. A bracket 30 is secured to the lower section 10 of the front bolster adjacent the king bolt 12 and has one arm portion of a substantially U-shaped operating member 31 pivoted thereto as illustrated at 32. The other arm portion of the member 31 is bent at right angles to form an extension 33, which overlies the upper edge of the forward end of the bar 28. The web portion of the member 31 is provided with a plurality of apertures 34, whereby a link 35 may be adjustably connected thereto. The link 35 is pivoted to the member 31 and to an arm 35' which is secured to the pivoted end of a tongue 36. The tongue 36 is pivoted between a pair of relatively spaced arms 37, which are secured to the lower section 10 of the front bolster as shown at 38. The pivoted end of the tongue 36 has a weight 39 secured thereto for normally holding the tongue in a substantially vertical position as shown in Fig. 3. When the tongue 36 is in a substantially vertical position or in an inoperative position, the extension 33 of the member 31 is elevated permitting the forward end of the bar 28 to move upwardly which permits the pin 25 to slide upwardly within the king bolt 12, thus allowing the spring 19 to force the brake shoes 17 into engagement with the rear wheels 5 of the truck or wagon, thus preventing the truck or wagon from accidentally traveling unattended from one point to another. When a person desires to use the truck, the tongue 36 is swung down to a substantially horizontal position as illustrated in Fig. 1, or in other words, to an operative position and when in this position, the link 35 swings the member 31 upon its pivot causing the extension 33 to pull downwardly upon the bar 28, which pulls downwardly upon the pin 25, the pin 25 pulls downwardly upon the horizontal arm portion 26 of the bell crank lever 23 causing the vertical arm portion thereof to push the rod 21 rearwardly disengaging the brake shoes 17 from engagement with the wheels 5, thus it will be seen that when the tongue 36 is in operative position, the brakes are released from the rear wheels and as soon as the tongue 36 is released by the user of the truck, it swings to a substantially vertical position permitting the spring 19 to apply the brake to the rear wheels.

When desiring to use the aforedescribed wagon or truck in connection with loading baggage or the like upon railway cars, it is customary to pull the truck or wagon along the side of the doorway of the car which is being loaded and the person or persons who are loading the baggage on to the car from the truck, stand upon the truck and as the forward end of the truck or wagon becomes unloaded, it is customary to grip the side of the car and push the truck forwardly to bring the rear of the truck or wagon in front of the door so that the baggage or the like upon the rear end of the truck or wagon may be placed within the car. In order to prevent the brake shoes from being applied to the rear wheels 5 by the springs 19, a rod 40 is provided as illustrated at 41 and is adapted to have its free end inserted within a socket 42 formed in the forward end of the body 1 of the truck or wagon so as to hold the tongue in substantial horizontal position or in an operative position, whereby the truck is free to be pushed forwardly or rearwardly.

Referring to my modified form of invention as illustrated in Figs. 7 and 8, it consists of a bar 43 adapted to be substituted for the substantially U-shaped member 31 of my preferred form of invention and has one end bent to form an eye 44 to receive the pivot 32 of the bracket 30 which is secured to the lower section 10 of the front bolster. The other end of the bar 43 is disposed forwardly of the front bolster and has formed thereon a right angled extension 45 which is adapted to engage the upper edge of the forward end of the bar 28. A downwardly depending ear 46 is formed upon the free end of the bar 43 and has pivoted thereto the rear end of the link 35, whereby upon movement of the link 35, rearwardly, the free end of the bar 43 is moved downwardly, moving the forward end of the bar 28 downwardly, causing the rod 21 to move rearwardly disengaging the brake shoes 17 from the rear wheels 5.

While I have shown and described the preferred embodiment of my invention, it will be understood that minor changes in construction, combination and arrangement of parts may be made without departing from the spirit and scope of the invention as claimed.

What is claimed is:

1. A truck including a brake, a pivoted tongue, means automatically raising the tongue when released, tension means adapted to apply the brake on elevation of the tongue, and a rod secured to the tongue and adapted to engage the truck to hold said tongue in a lowered position and also hold the brake in a released position.

2. In combination, a truck body having bolsters connected by a hollow king bolt, a self-applied brake carried by said body, a tongue pivoted to one of said bolsters, and means connecting the tongue with the brake and extending through the king bolt for moving said brake into non-brake applying position when the tongue is moved into pulling position and adapted to return said tongue to a non-pulling position when released from the former position.

In testimony whereof I affix my signature in presence of two witnesses.

EDWIN W. TUCKER.

Witnesses:
R. C. BAGLEY,
Mrs. A. D. WILSON.